United States Patent [19]

Liermann

[11] 4,273,208
[45] Jun. 16, 1981

[54] SYSTEM FOR CONTROLLING THE SPEED OF AN AUTOMOTIVE VEHICLE

[75] Inventor: Peter Liermann, Gehrden, Fed. Rep. of Germany

[73] Assignee: WABCO Fahrzeugbremsen GmbH, Hanover, Fed. Rep. of Germany

[21] Appl. No.: 34,535

[22] Filed: Apr. 30, 1979

[30] Foreign Application Priority Data

May 2, 1978 [DE] Fed. Rep. of Germany ....... 2819175

[51] Int. Cl.$^3$ ............................................. B60K 31/00
[52] U.S. Cl. .................................. 180/179; 123/352; 180/167; 180/176; 188/273
[58] Field of Search ............... 180/179, 170, 177, 176, 180/178, 167; 123/102, 107; 188/273, 267, 181 R; 74/866, 867, 861

[56] References Cited

U.S. PATENT DOCUMENTS

| | | | |
|---|---|---|---|
| 2,035,047 | 3/1936 | Cotter | 188/181 R |
| 3,460,406 | 8/1969 | Strohm et al. | 180/179 |
| 3,947,073 | 3/1976 | Cattaneo et al. | 188/273 |
| 4,106,584 | 8/1978 | Matsubara | 188/273 |
| 4,133,406 | 1/1979 | Allerdist | 180/179 |
| 4,166,514 | 9/1979 | Freminville | 180/179 |

FOREIGN PATENT DOCUMENTS

| | | | |
|---|---|---|---|
| 2139411 | 2/1973 | Fed. Rep. of Germany | 180/179 |
| 2293100 | 6/1976 | France | 188/267 |

Primary Examiner—David M. Mitchell
Attorney, Agent, or Firm—A. G. Williamson, Jr.

[57] ABSTRACT

Signals representing actual and desired speeds of a vehicle are separately applied to a plurality of parallel comparator channels or devices. Each comparator device responds to a different level of difference between the speed signals, when actual is greater than desired, to produce output signals at successively higher levels. The first comparator device controls a first deceleration device, e.g., an exhaust throttle, to reduce vehicle speed when an output signal is produced at the first preselected level of difference. The second and third comparator devices control the second and third deceleration devices, respectively, e.g., an eddy-current brake, automatic transmission, etc., when each produces an output signal at its preselected difference level, but only if the next lower comparator output has enabled a gate or switch coupling the higher level comparator and deceleration devices. Thus the deceleration control is increased in successive steps as the speed difference increases if each successive deceleration device is actuated in order by the associated comparator.

4 Claims, 4 Drawing Figures

SYSTEM FOR CONTROLLING THE SPEED OF AN AUTOMOTIVE VEHICLE

The invention relates to a system for controlling the speed of an automotive vehicle equipped with a service brake system and an additional decelerating system for reducing the speed of the vehicle.

Systems for controlling vehicle speed by intervention in the drive system (e.g., control of the fuel supply) are well known.

The purpose of these systems is to free the driver, by simple means, of the job of holding the vehicle at a given, constant speed. In order to reduce the speed of the vehicle, however, the driver must operate the service brake system or the decelerating system.

Decelerating systems are used especially in trucks. They are actuated, for example, on downhill runs to reduce the speed of the vehicle. Examples of commonly used decelerating systems are an exhaust throttle valve, an eddy-current brake, a hydraulic brake and an air-resistance decelerator. One of the purposes of decelerating systems is to avoid excessive use, and thus high wear, of the service brake. However, the operation (connection, disconnection, changing) of the declerating system must be constantly adapted by the driver to the driving situation, e.g., gradient, load etc.

The object of the invention, therefore, is to provide a control system which makes it possible, in a simple way, to relieve the driver of the operation of the braking or deceleration systems to hold the vehicle at a given, constant speed.

One of the advantages of the invention is that in downhill driving, for example, the speed of the vehicle is maintained according to preselected values without any special action on the part of the driver. The use of a controlled system makes possible the use of electronic components, especially of antiskid protective systems. Electronic components can be advantageously adapted by simple means to various conditions with respect to their input and/or output quantities. Furthermore, external control of the device that supplies the desired value is possible with the system of the invention. In particular, transmitters located along the road can be used to transmit signals to the vehicle to keep it at the proper speed or, especially, to force it to stay within the speed limit.

The invention is now described in more detail on the basis of specific embodiments which are shown in the drawings, in which:

FIG. 1 shows a basic diagram of the system of the invention in which the individual parts or elements are illustrated as conventional blocks representing an electronic embodiment of the invention. However, it is also possible to design some of the parts to be purely or largely mechanical.

Figure 1:
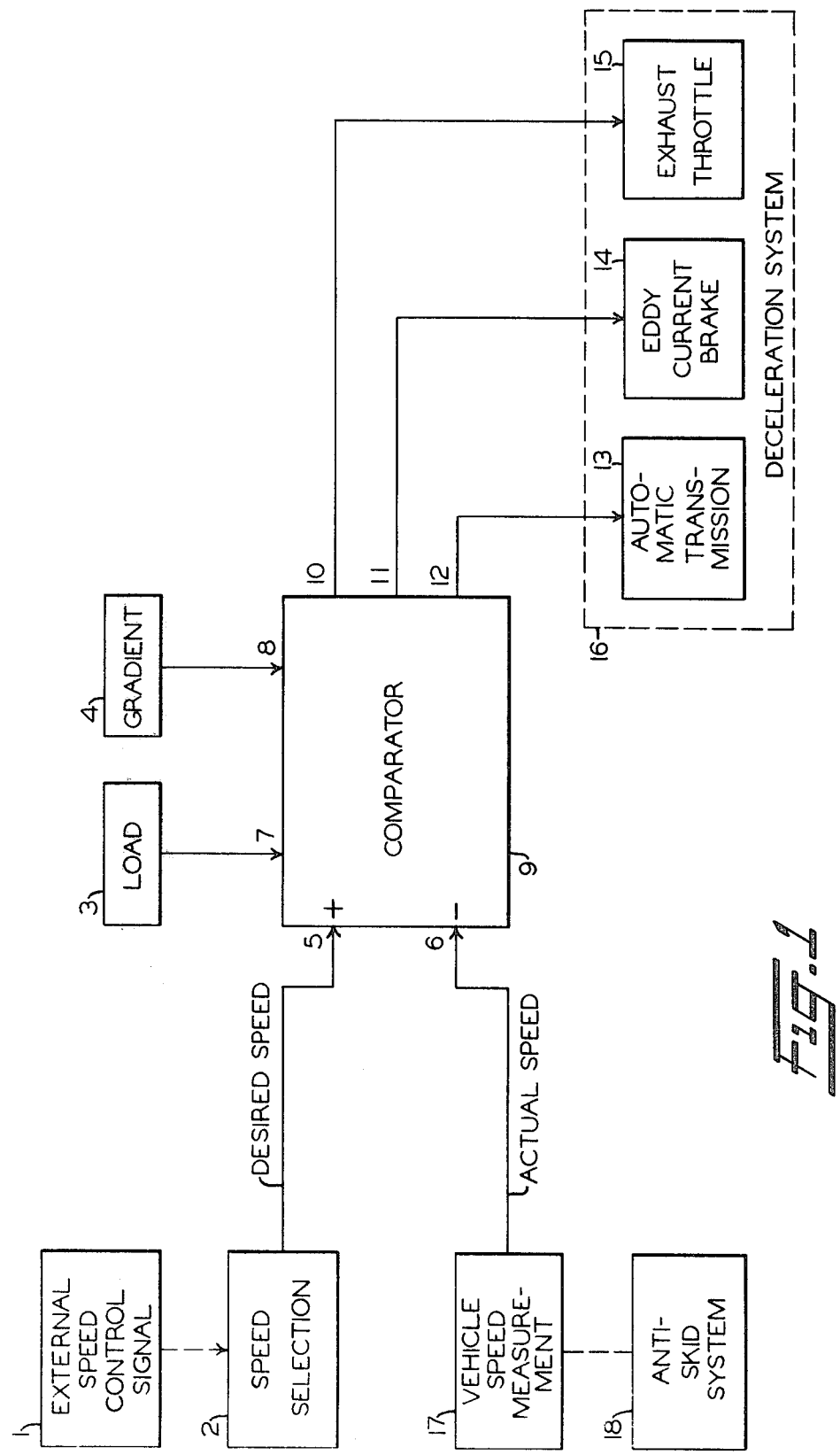
FIG. 1 shows a block diagram of the basic system of the invention.

The purpose of the system shown in FIG. 1 is to control the speed of a vehicle, e.g., a truck, according to a constant speed value or according to a speed value whose behavior has been predetermined. The speed of the vehicle is detected in vehicle speed measuring circuit 17, whose output signal corresponds to the value of the actual speed of the vehicle.

Various types of known apparatus may be used for element 17. A device 18, such as is necessary for known antiskid systems, and that may already be present on the truck for controlling the service brake system, can also be advantageously used to provide a signal to circuit 17 that is dependent on the speed of the vehicle. Signals corresponding to the speed of the vehicle are usually produced in an antiskid system of this type. In FIG. 1 the possibe use of this available signal is indicated by a broken line connecting device 18 and circuit 17.

The output signal of circuit 17, which is regarded as the actual speed value, is compared in comparator 9 with a desired speed signal corresponding to the predetermined speed. A circuit element 2 for preselection of the speed is provided for obtaining the desired value. In the simplest case, circuit 2 consists of a potentiometer at whose adjustable pickup it is possible to obtain a voltage signal that corresponds to the preselected desired speed.

The system of the invention provides a means of controlling the speed of the vehicle by external senders or transmitters. This makes it possible, for example, to have forced automatic speed control according to the nature of the road that is being traveled. In FIG. 1 this control of the speed that is to be observed is realized by a roadside device 1 for speed control, which acts on circuit 2 as indicated in the drawing by the broken line connecting device 1 and circuit 2. The output signal (desired value) of the circuit 2 is thus affected either by the driver or by transmitters located along the road.

In order to compare the desired speed with the actual speed, the output of circuit 2 is connected with the input 5 of the comparator circuit 9, and the output of circuit 17 is connected with the input 6 of the comparator circuit 9. The signs "+" and "−" placed at inputs 5 and 6 indicate that in the simplest case the comparison is made by taking the difference between the desired value and the actual value, when actual speed is greater than the desired speed. The comparator circuit 9 is designed in such a way that it successively produces signals at its outputs 10, 11 and 12 with increasing difference between the desired speed signal and the actual speed signal. For example, as will be discussed later (FIG. 3), comparator 9 may include a separate element or channel for each decelerating device with each channel having a different threshold or difference level to which it responds. These output signals serve to control several decelerating devices 15, 14, 13 of the truck, whereby, for example, decelerating device 15 is actuated or controlled first, when decelerating device 14, and finally decelerating device 13. The decelerating devices 13, 14, 15 are parts of a decelerating system 16, which can also consist of a single decelerating device in the simplest case.

An exhaust throttle, such as shown in U.S. Pat. No. 4,106,584, is used as decelerating device 15, which is the only decelerating device to be operated when the difference between the desired speed and the actual speed is small. The engine throttle valve in question is digitally opened or closed. Accordingly, the signal at the output 10 of the comparator circuit 9 is rectangular when it changes. A similarly controlled eddy-current brake serves as decelerating device 14. Such an arrangement is shown in U.S. Pat. No. 2,035,047. The signal at output 11 of comparator circuit 9 that controls the eddy-current brake 14 is best adjusted in such a way that the eddy-current brake 14 is not actuated until the throttle valve of device 15 is already in operation. This means that, starting from high speeds and thus relatively large differences between the desired and actual vehicle speeds, as the speed of the vehicle decreases, the action of the eddy-current brake 14 is reduced first, and the throttle of decelerating device 15 is not taken out of action until later.

An automatic transmission an example of which is shown in U.S. Pat. No. 3,460,406, is used as decelerating device 13. In order to reduce the speed of the vehicle, the gears are changed to a lower gear ratio. Preferably, the automatic transmission 13, which is controlled by output 12 of the comparator circuit 9, is operated only at high speeds, that is, with the largest difference in speed values. The decelerating system can also incorporate part of the auxiliary or emergency brake system of the vehicle. Finally, it is also possible to control part or all of the service brake system in addition to the other decelerating devices from an output of comparator circuit 9, especially when the speed must be reduced from very high values. Electromagnetically or electrically operated decelerating devices are especially well suited as decelerating devices for the system of the invention because they can be directly connected to the comparator circuit without connecting links.

It is also possible and advantageous to be able to control the selection and/or number of decelerating devices that are controllable from the comparator circuit 9 as a function of the conditions and nature of the road. Two auxiliary controls are provided for this purpose. One of these controls (3) can be adjusted as a function of the load, and the other (4) can be adjusted as a function of the gradient of the road. Auxiliary control 3 is connected to a corresponding input 7 of comparator circuit 9, and auxiliary control 4 is connected to a corresponding input 8 of the comparator circuit. Auxiliary controls 3 and 4 are conveniently adjusted with a scale, which is calibrated for the corresponding quantity (load or gradient).

Figure 2:
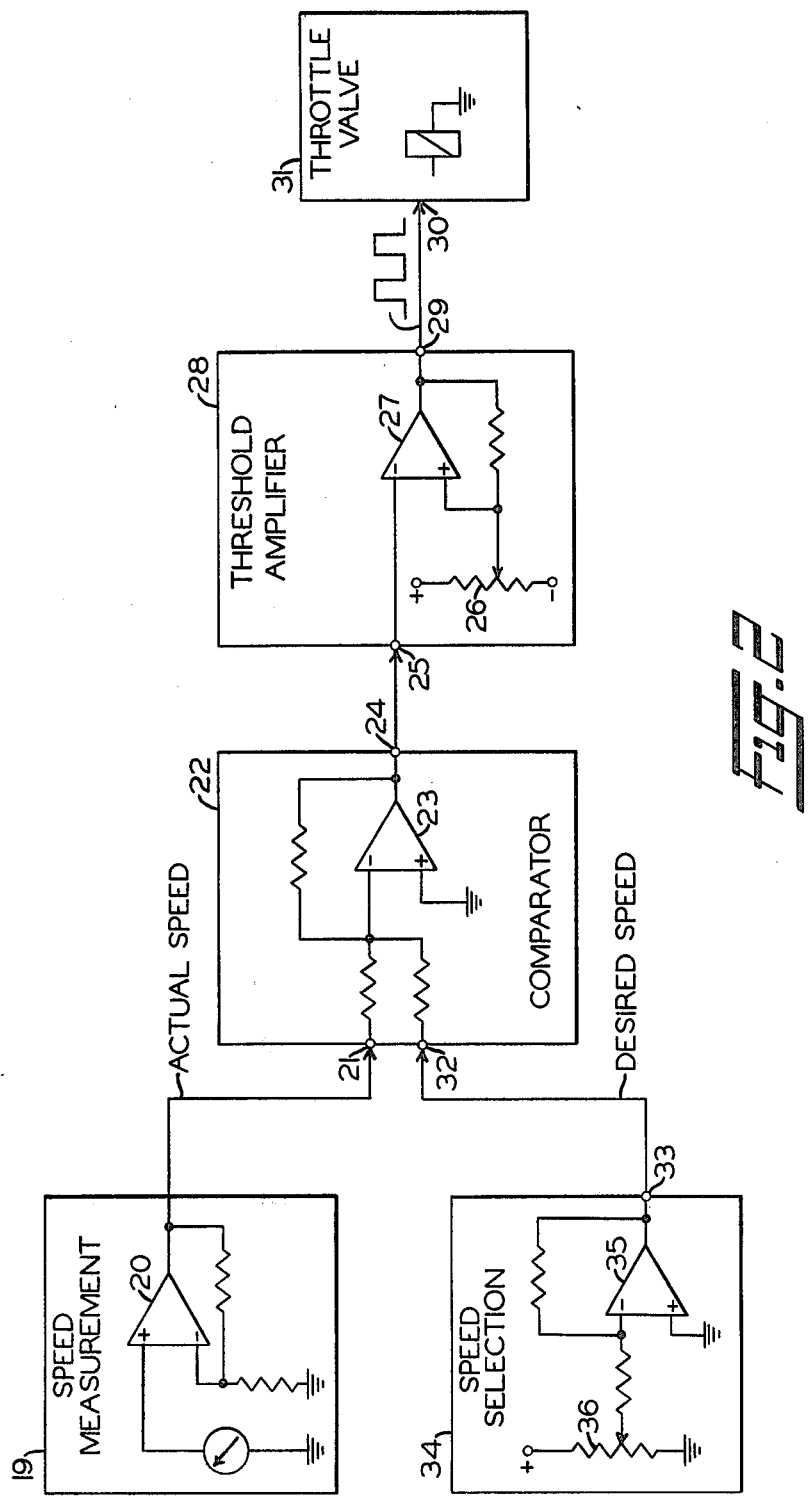
FIG. 2 shows a block circuit diagram of a first specific embodiment of the system of the invention.

FIG. 2 shows a simplified block circuit diagram for a specific embodiment of the invention. This system is for controlling the speed of a truck, whereby the electrically controllable throttle valve 31 of an exhaust throttle (decelerating device) is used as the control device. The value corresponding to the actual speed of the vehicle is produced in a speed measurement circuit 19 which contains a noninverting amplifier 20, at whose output a signal is produced which is proportional to the speed of the vehicle. Amplifier 20 is equipped with a negative feedback, for which a voltage divider is provided. The output signal of a speed indicator is supplied to the noninverting input of amplifier 20. The output of circuit 19 is connected to the input 21 of a comparator 22.

The desired value signal corresponding to the preselected speed is supplied to a second input 32 of comparator 22 via a connection from the output 33 of a circuit 34 for preselection of the desired speed. Circuit 34 contains a potentiometer 36, with which the desired speed can be adjusted. The adjustable slide of the potentiometer 36 is connected with the inverting input of a differential amplifier 35, whose noninverting input is connected to the reference voltage (ground). The amplification of the inverting amplifier 35 is determined by the ratio of the resistance values of the resistors shown within block 34.

It is observed that a noninverted signal proportional to the speed of the vehicle and an inverted signal inversely proportional to the desired speed of the vehicle arrive at inputs 21 and 32 of comparator 22. Comparator 22 contains a differential amplifier 23 that acts as a reverse adder, and whose inverting input is connected through separate resistors to inputs 21 and 32. These resistors form a summing circuit for the currents produced by the signals supplied to inputs 21 and 32. Since the signal supplied to input 32 is inversely proportional to the desired speed, a signal corresponding to the difference between the desired value and the actual value is produced at the output of amplifier 23, whose noninverting input is connected to the reference voltage (ground).

The output 24 of comparator 22 is connected with the input 25 of a threshold amplifier 28 which includes a differential amplifier 27 connected as a Schmitt trigger circuit. Specifically, the inverting input of differential amplifier 27 is connected to the input 25 of the threshold amplifier 28, and its noninverting input is connected to the adjustable pickup of a potentiometer 26. At the output of the differential amplifier, and thus at the output 29 of the threshold amplifier 28, a signal activating the throttle valve appears only when the output signal of the comparator 22 exceeds a value that depends on the adjustment of the potentiometer 26. In this way the output signal of the threshold amplifier 28 exhibits rectangular behavior, as indicated schematically, when the amplitude of the output signal of the comparator 22 varies around the threshold value established by potentiometer 26.

The output 29 of the threshold amplifier 28 is connected with the input 30 of an electrically operated throttle valve 31 for exhaust throttling. The throttle valve 31 is thus actuated whenever the actual speed of the vehicle deviates by a given amount from the preselected desired speed, in other words, whenever the speed of the vehicle must be reduced. When the desired speed or a lower value has been reached, the throttle valve 31 is automatically shut off. Hysteresis behavior of the described control system enhances the oscillation security of the system. Hysteresis behavior of this sort is easily achieved with a positive feedback resistor between the output and the non-inverting input of the differential amplifier 27.

Figure 3:
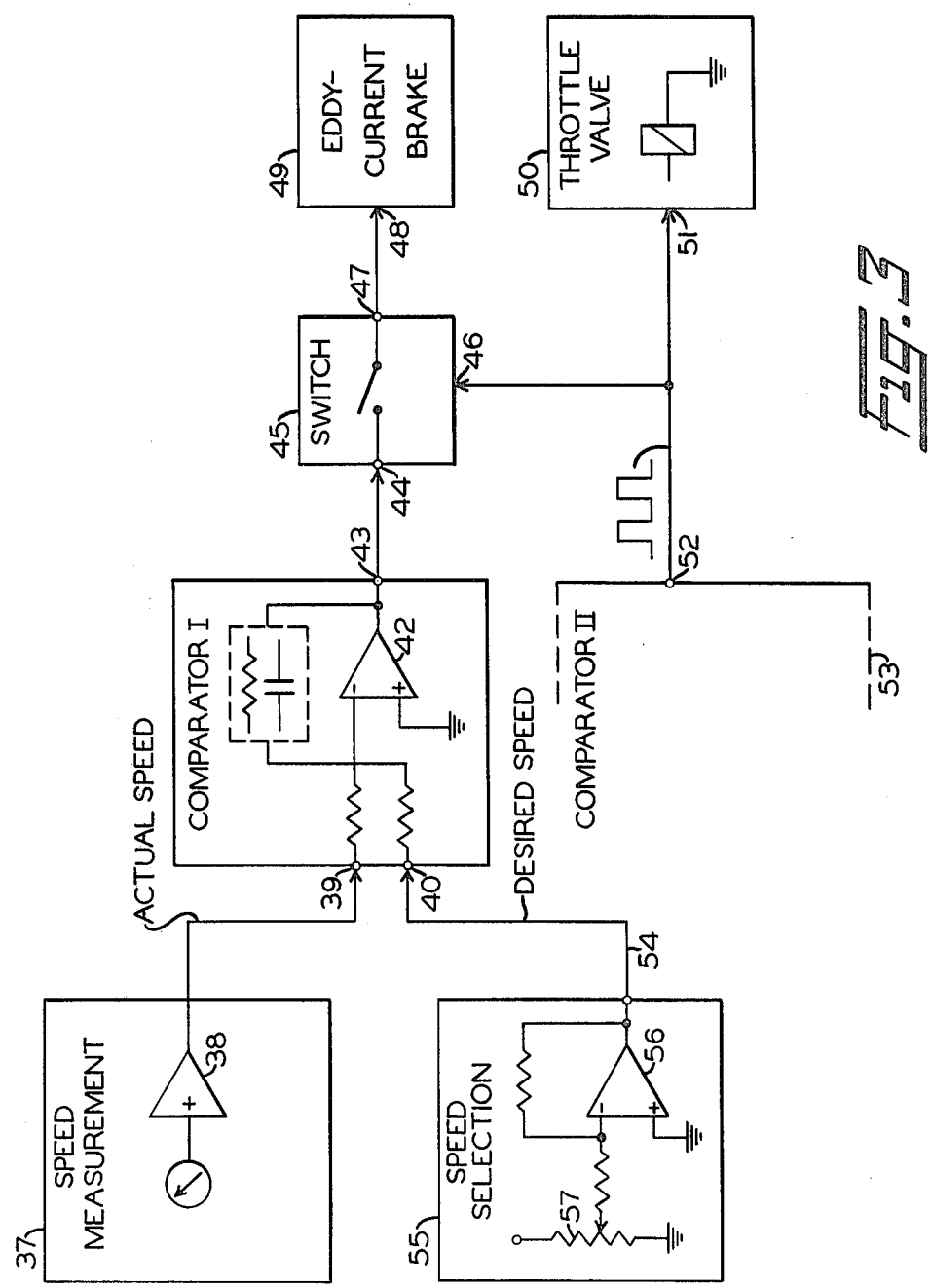
FIG. 3 is a block circuit diagram of another specific arrangement embodying the invention.

The simplified block circuit diagram in FIG. 3 represents another specific embodiment of the invention. The system in FIG. 3, like those shown in FIGS. 1 and 2, is used to control the speed of a vehicle, e.g., a truck, by means of a decelerating system. However, in contrast to the system in FIG. 2, two decelerating devices are controlled by the system in FIG. 3. Nevertheless, some of the components of the system in FIG. 3 are also found in the system in FIG. 2. Reference will therefore be made to the explanations given earlier for FIG. 2 when the design and function of individual circuit components are the same. Further, the specific manner in which three (FIG. 1) or more decelerating devices may be controlled will be apparent from the showing and explanation of FIG. 3.

In the system in FIG. 3, a circuit 55 containing a potentiometer 57 and a differential amplifier 56 is used to produce the desired speed. Circuit 55 corresponds to circuit 34 in FIG. 2. The output 54 of circuit 55 is connected with the input 40 of comparator I (41). A circuit 37, which contains an amplifier 38, corresponds to circuit 19 in FIG. 2 and produces the actual vehicle speed output signal which is supplied to a second input 39 of comparator 41.

Comparator 41 is basically similar to comparator 22 in FIG. 2 except for additional components in the negative feedback branch of amplifier 42, such as a bypass capacitor. Thus the comparator 41 exhibits a proportional-plus-derivative control behavior with respect to the difference between the desired and actual speed signal values at the inverting input of amplifier 42. This behavior can be adapted to the particular system properties that are desired by means of the selection of additional components in the negative feedback branch.

The output 43 of comparator 41 is connected with the input 44 of a switch 45 which is controllable by control input 46. The output 47 of switch 45 is connected with the control input 48 of a decelerating device 49 that is designated as an eddy-current brake. In this way the connection between the output 43 of comparator 41 and the control input 48 of the eddy-current brake 49 can be eatablished and broken by switch 45.

The control input 46 of switch 45 is connected with the output 52 of a comparator II conventionally shown by block 53. This comparator block 53 represents a complete signal comparator channel such as shown in FIG. 2 so that the signals produced at output 52, as schematically shown, correspond to the output signals of the threshold amplifier 28 in FIG. 2. Thus the output 52 of comparator 53 is also connected with the control input 51 of throttle valve 50.

The controllable switch 45 is designed in such a way that it is closed only when there is a signal at its control input 46 which also actuates the throttle valve 50. This means that the eddy-current brake 49 can be operated only when the throttle valve 50 is also in operation. Obviously, one type of switch which may be used is a two-input AND gate element in which the presence of a signal at input 46 enables the gate to pass signals applied at input 44.

Figure 4:
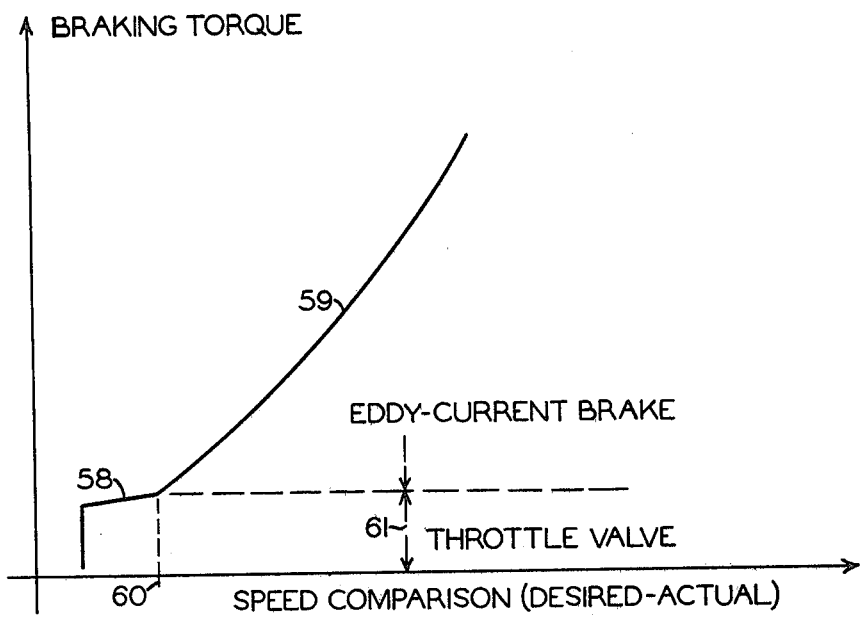
FIG. 4 is a chart diagram explaining the operation of the system shown in FIG. 3.

FIG. 4 shows a braking torque characteristic curve that can be obtained with the system shown in FIG. 3. The graph shows the braking torque as a function of the difference between the desired speed and the actual speed measured in the system. The braking torque characteristic curve is formed by curves 58 and 59. It is assumed that (going from low speeds to high speeds) throttle valve 50 in FIG. 3 is actuated first; its braking torque 61 is assumed to have an almost constant value.

The speed of the difference between the desired value and actual speed corresponding to the length of curve 58 is selected sufficiently large that the throttle valve and the eddy-current brake cannot be simultaneously actuated or released. The actuation point, at value 60, for the eddy-current brake 49 in FIG. 3 (curve 59) is adjustable by the potentiometer 57 in block 55 in FIG. 3. The switch 45 in FIG. 3 provides additional security against possibly premature connection of the eddy-current brake 49. The course of curve 59 is indefinitely selectable within given limits through the design of the electronic circuit components.

Having thus described my invention, what I claim and desire to secure by Letters Patent is:

1. A system for controlling the speed of a vehicle, which is provided with service brake apparatus and a plurality of other deceleration devices for reducing vehicle speed, comprising, (a) a speed measuring means responsive to vehicle movement for supplying a first signal representing actual vehicle speed, (b) a source supplying a second signal representing desired vehicle speed, (c) a comparator means having a plurality of channels, each channel associated with a different one of said other deceleration devices and coupled to said speed measuring means and said desired speed source for comparing said first and second signals, said channels generating separate output signals at different preselected levels of difference between said first and second signals, (d) a first comparator channel being coupled for actuating a first other decelerating device when an output signal is produced at the lowest of said preselected difference levels to provide an initial level of additional deceleration of said vehicle, (e) a separate switch means coupled between the second and each higher numbered comparator channel and the associated other deceleration device, and enabled by an output signal from the next lower numbered channel for supplying an output signal from the associated channel to the associated other deceleration device to actuate increasing additional deceleration of said vehicle as successive preselected higher levels of difference between actual and selected speed signals are exceeded.

2. A vehicle speed control system as defined in claim 1, in which, said source of desired speed signal is periodically coupled for receiving a selected speed signal from wayside devices which transmit predetermined speed selections to passing vehicles.

3. A speed control system as defined in claim 1 or 2 in which said comparator means comprises, (a) a first comparator element coupled to said speed measuring means and said source and responsive to the lowest preselected level of difference between said first and second signals for generating an output signal, (1) said first comparator element further coupled for supplying said output signals to actuate said first deceleration device and to enable a first of said switch means associated with said second deceleration device, (b) a second comparator element also coupled to said speed measuring means and said source and responsive to an intermediate preselected level of difference between said first and second signals for supplying an output signal to said first switch means to actuate said second deceleration device and to enable a second switch means associated with said third deceleration device, only when said first switch means is enabled, and (c) a third comparator element coupled to said speed measuring means and said source and responsive to a second higher preselected level of difference between said first and second signals for supplying an output signal to said second switch means to actuate said third deceleration only when said second switch means is enabled.

4. A speed control system as defined in claim 3 in which, each switch means is an AND gate element coupled for receiving an enabling signal from the next lower order comparator channel and output signals from the associated comparator element.

* * * * *